(12) United States Patent
Kvalnes et al.

(10) Patent No.: US 12,242,482 B2
(45) Date of Patent: Mar. 4, 2025

(54) COPYING GRAPH DATA BETWEEN TENANCIES IN DIFFERENT REGIONS

(71) Applicant: Microsoft Technology Licensing, LLC, Redmond, WA (US)

(72) Inventors: Åge Andre Kvalnes, Fetsund (NO); Kaare Koehler Hoevik, Porsgrunn (NO); Tim Schmidt, Olso (NO); Nicholas John Elder, Bellevue, WA (US); Charitha Herath Daskon Herath Mudiyanselage, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 96 days.

(21) Appl. No.: 17/982,198

(22) Filed: Nov. 7, 2022

(65) Prior Publication Data

US 2024/0152518 A1   May 9, 2024

(51) Int. Cl.
*G06F 16/2455* (2019.01)
*G06F 16/176* (2019.01)

(52) U.S. Cl.
CPC ...... *G06F 16/24552* (2019.01); *G06F 16/176* (2019.01)

(58) Field of Classification Search
CPC .................. G06F 16/24552; G06F 16/176
See application file for complete search history.

(56) References Cited

U.S. PATENT DOCUMENTS

| | | | |
|---|---|---|---|
| 8,495,021 B2 | 7/2013 | Srivastava et al. | |
| 8,886,631 B2 | 11/2014 | Abadi et al. | |
| 10,467,229 B2 | 11/2019 | Kreutzer et al. | |
| 10,545,945 B2 | 1/2020 | Heen et al. | |
| 2011/0184936 A1 | 7/2011 | Lymberopoulos et al. | |

(Continued)

FOREIGN PATENT DOCUMENTS

| CN | 101452541 A | * | 6/2009 |
|---|---|---|---|
| CN | 113392280 A | | 9/2021 |

(Continued)

OTHER PUBLICATIONS

"Amazon Neptune User Guide", Retrieved from: https://docs.aws.amazon.com/pdfs/neptune/latest/userguide/neptune-ug.pdf, Dec. 18, 2020, 1166 Pages.

(Continued)

*Primary Examiner* — Hosain T Alam
*Assistant Examiner* — Anthony G Gemignani
(74) *Attorney, Agent, or Firm* — NovoTechIP International PLLC

(57) ABSTRACT

The disclosed technology is generally directed to graph queries with reduced latencies. In one example of the technology, there is a cross-tenancy collaboration between two different tenancies: a first tenancy that is homed in a first geographical region and a second tenancy that is homed in a second geographical region. In the first geographical region, a first set of graph data is stored. The first set of the graph data is associated with the first tenancy. A portion of the first set of the graph data to be copied from the first geographical region to the second geographical region is determined. In response to determining the portion of the first set of the graph data, a copy of the portion of the first set of the graph data is stored in the second geographical region.

20 Claims, 5 Drawing Sheets

(56) References Cited

U.S. PATENT DOCUMENTS

| | | |
|---|---|---|
| 2011/0225121 A1 | 9/2011 | Cooper et al. |
| 2014/0280939 A1 | 9/2014 | Banatwala et al. |
| 2017/0228560 A1* | 8/2017 | Johnson ................ H04L 63/20 |
| 2018/0307726 A1 | 10/2018 | Kreutzer et al. |
| 2021/0073291 A1* | 3/2021 | Hunter .................... G06F 8/33 |
| 2022/0138220 A1 | 5/2022 | Ahmad |

FOREIGN PATENT DOCUMENTS

| | | | |
|---|---|---|---|
| CN | 113704309 A * | 11/2021 | ......... G06F 16/2453 |
| EP | 3296896 A1 | 3/2018 | |

OTHER PUBLICATIONS

Vice, et al., "Microsoft 365 inter-tenant collaboration", Retrieved from: https://learn.microsoft.com/en-us/microsoft-365/enterprise/microsoft-365-inter-tenant-collaboration?view=o365-worldwide, Sep. 29, 2022, 8 Pages.

Zhang, et al., "Distance-Aware Selective Online Query Processing Over Large Distributed Graphs", In Journal of Data Science and Engineering, Jan. 18, 2017, pp. 2-21.

International Search Report and Written Opinion received for PCT Application No. PCT/US23/033768, mailed on Dec. 14, 2023, 22 pages.

* cited by examiner

COPYING GRAPH DATA BETWEEN TENANCIES IN DIFFERENT REGIONS

BACKGROUND

In a graph structure, entities are typically presented as nodes, and relationships between those entities are presented as edges in a view of a relational graph that is maintained by a graph database. The relational graph may be periodically queried by users via graph queries to learn about the relationships between entities. For example, a user may issue a graph query to find friends or contacts within a social network, the documents that a given user has interacted with, the users that a given document has been accessed by, the entities that satisfy various search criteria, or the like.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to graph queries with reduced latency, as follows according to some examples. Policies that are associated with a cross-tenancy collaboration in a multi-tenant service are provided. The cross-tenancy collaboration is a collaboration between two different tenancies including a first tenancy that is homed in a first geographical region and a second tenancy that is homed in a second geographical region that is different from the first geographical region. A first plurality of users is associated with the first tenancy. A second plurality of users, different from the first plurality of users, is associated with the second tenancy.

In the first geographical region, a first set of graph data is stored. The first set of the graph data is associated with the first tenancy. The first plurality of users and the second plurality of users are enabled to perform interactions that are associated with the multi-tenant service, including cross-tenancy interactions between the first tenancy and the second tenancy in accordance with the policies. A portion of the first set of the graph data to be copied from the first geographical region to the second geographical region is determined. In response to determining the portion of the first set of the graph data, a copy of the portion of the first set of the graph data is stored in the second geographical region.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
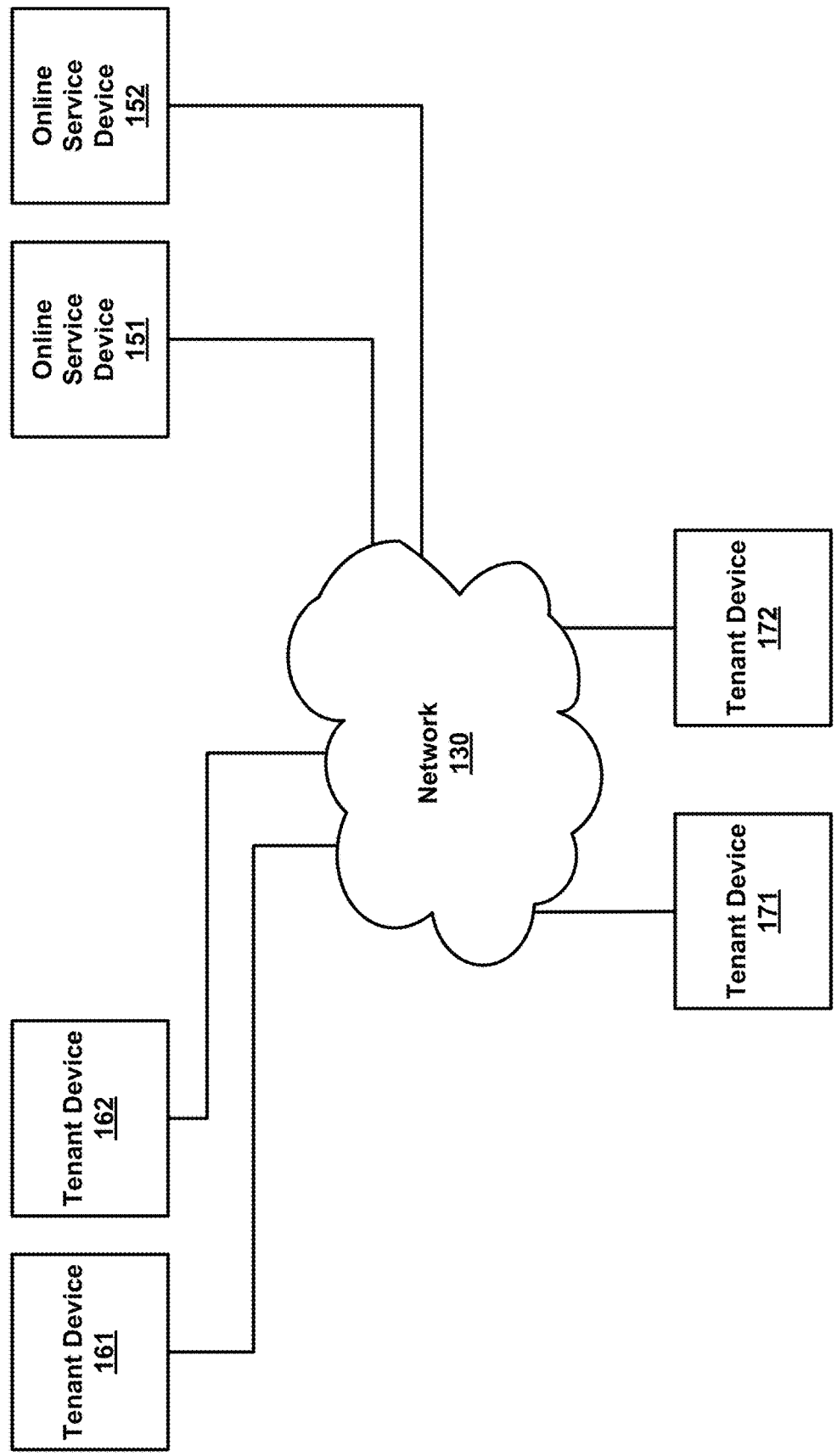
FIG. 1 is a block diagram illustrating an example of a network-connected system.

A productivity service may provide various services to each tenant of the productivity service. For instance, the productivity service may provide to users of each tenant various services, including cloud services, access to various applications, communications services, security services, device management services, file services including the storing, access, and sharing of files by the users of the tenant, or the like. Each user has a native identity that is associated with the tenant to which the user belongs. The productivity service has multiple geographical regions that are defined by server coverage of the productivity service. Each tenant is homed in at least one particular geographical region, where data associated with the tenant is stored on behalf of the tenant.

Each tenant may have various associated policies, including data access policies that control access to data that is stored by the productivity service on behalf of the tenant. The data access policies may indicate which users associated with the tenant have access to which data. Under normal circumstances, users that do not have an account with the tenant do not have access to services or data that is associated with a tenant.

Data stored by the productivity service on behalf of tenants may have a graph structure. In a graph structure, entities are typically presented as nodes, and relationships between those entities are presented as edges in a view of a relational graph that is maintained by a graph database. The relational graph may be periodically queried by users via graph queries to learn about the relationships between entities. For example, a user may issue a graph query to find friends or contacts within a social network, the documents that a given user has interacted with, the users that a given document has been accessed by, the entities that satisfy various search criteria, or the like.

Under various circumstances, it may be desirable for a person outside of the organization that is associated with a tenant to have access to services, data, or the like that is associated with the tenant. For example, it may be desirable for a consultant that is not an employee of the organization to have access to services, data, or the like that is associated with a client. Typically, this would require the consultant to create a guest account with the tenant, to which the consultant would typically need to sign in to. If a consultant performed consultancy services with multiple different tenants, this would then typically require constantly logging in and out of several different accounts associated with different tenancies. The outside consultant is typically unable to use the outside consultant's native identity to access services, data, or the like that are associated with a tenant.

Similarly, if two tenants wished to collaborate with each other in some manner, it would typically not be possible for the users of the different tenants, while using their native identities, to share documents with each other using the productivity service.

However, in various examples, the productivity service enables its tenant to create a cross-tenant collaboration in which it is possible for tenants to use their native identities to share experiences, services, data, or the like with each other. Access policies, security policies, and the like may be used to control the access that users of a different tenant are permitted to have. When a cross-tenancy collaboration exists, graph queries that span tenancies can be made. Such graph queries may include queries executed on behalf of a user in one tenancy that access graph data associated with another tenancy. Such graph queries may also include graph queries that are executed by the productivity service in support of a feature of the productivity service. However, if two collaborating tenancies are homed in different geographical regions, graph queries that span the two tenancies will incur additional latency because of the need for crossing geographical regions during execution of the graph query.

As discussed above, the geographical regions are defined by server coverage. "Different geographical regions" refers to geographical regions that are relatively distant from each other in terms of data access, such as sufficiently distant that there is a significant difference in data access time between the geographical regions. For instance, the geographical regions may be greater than 750 miles in distance, greater than 2000 miles in distance, or greater than 5000 miles in distance, where distance refers to server distance for data access. Geographical regions may be countries, states, counties, continents, sub-continents, multi-country regions, multi-state regions, multi-continent regions, or the like. Different regions may be non-overlapping or overlapping.

For instance, a collaboration agreement may be set up between a company in Canada and a company in Germany. In some examples, the company in Canada may be a tenant that is homed in the North American geographical region, and the company in Germany may be a different tenant that is homed in the Europe geographical region, where the North American geographical region is different from the Europe geographical region. The geographical regions may be defined in different ways in different examples. There are numerous other possible examples, such as a company in the United States and a company in Sweden, a company France and a company in Japan, a company in Denmark and a company in Italy, a company in Argentina and a company in Taiwan, a company in India and a company in Poland, or two relatively distant locations in the same country, as but a few examples.

Some or all of the graph data is copied from one tenancy into the other tenancy, and vice versa. For example, some or all of the graph data may be copied from the geographical region of one tenancy to the geographical region of the other tenancy, and vice versa, so that graph query execution can complete without crossing geographical regions (and thus not suffer from the latency incurred by such crossings). In various examples, the data copied into the region of one data into another may vary, and the timing by which the data is copied may vary, as discussed in greater detail below.

Illustrative Systems

FIG. 1 is a block diagram illustrating an example of a system (100). FIG. 1 and the corresponding description of FIG. 1 in the specification illustrate an example system for illustrative purposes that does not limit the scope of the disclosure. System 100 includes network 130, as well as online service devices 151 and 152, tenant devices 161 and 162 that are associated with a first tenant, and tenant devices 171 and 172 that are associated with a second tenant, which all connect to network 130.

Figure 5:
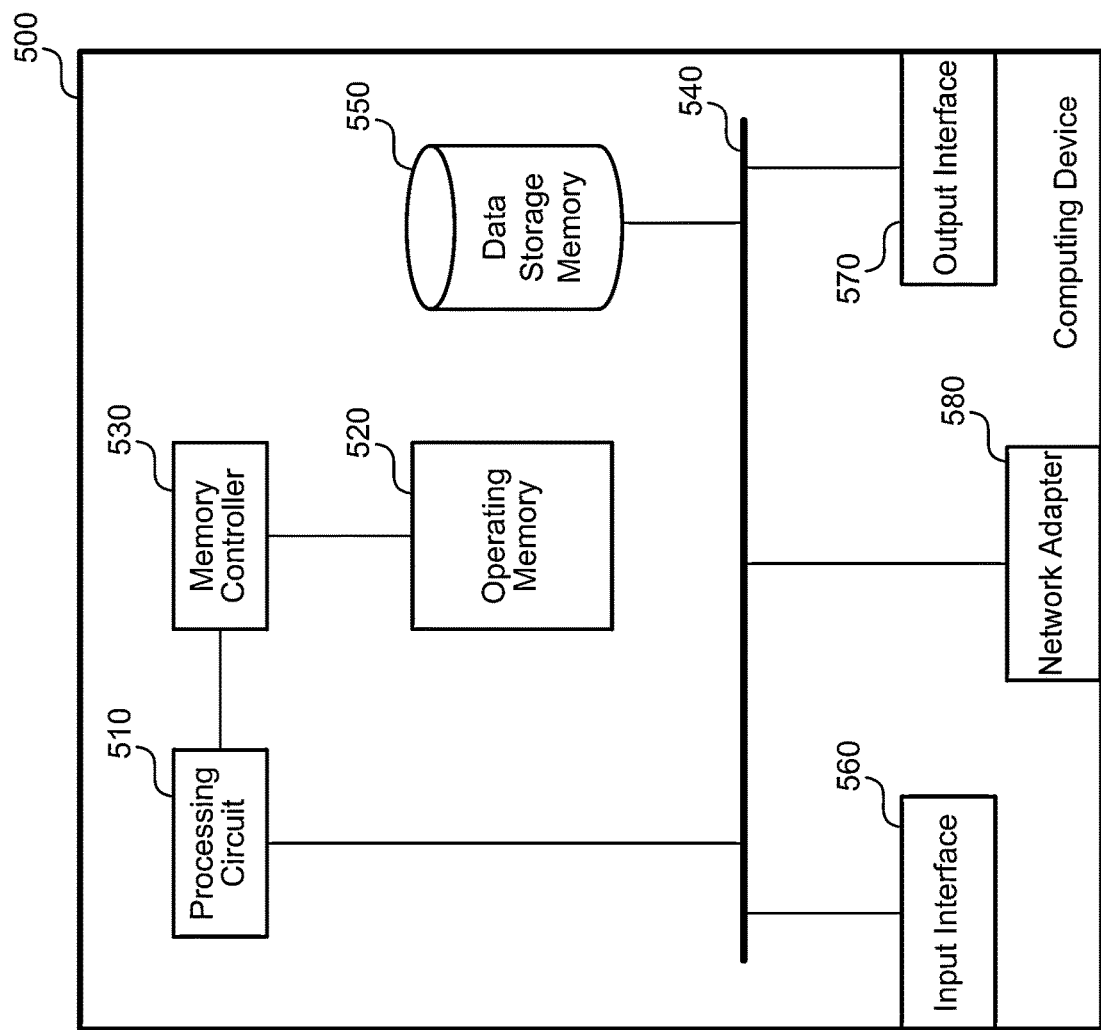
FIG. 5 is a block diagram illustrating one example of a suitable computing device, according to aspects of the disclosed technology.

Each online service devices 151 and 152, tenant devices 161 and 162, and tenant devices 171 and 172 include examples of computing device 500 of FIG. 5. Online service devices 151 and 152 are part of one or more distributed systems.

Online service devices 151 and 152 provide one or more services on behalf of users associated with a particular tenant. Among other things, the services provided by online service devices 151 and 152 may include productivity services, cloud services, communication services, or a variety of other services. Various tenants are subscribed with the online services provided by online service devices 151. Each tenant has users that may make use of the online services. Tenant devices 161 and 162 are used by users of a first tenant, and tenant devices 171 and 172 are used by users of a second tenant. As discussed in greater detail above and below, the online services may perform copying of graph data in cross-tenant collaborations between tenancies homed in different regions Network 130 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, and/or other communications links known to those skilled in the art. Furthermore, remote computers and other related electronic devices could be remotely connected to either LANs or WANs via a modem and temporary telephone link. Network 130 may include various other networks such as one or more networks using local network protocols such as 6LoWPAN, ZigBee, or the like. In essence, network 130 may include any suitable network-based communication method by which information may travel among online service devices 151 and 152, tenant devices 161 and 162, and tenant devices 171 and 172. Although each device is shown connected as connected to network 130, that does not necessarily mean that each device communicates with each other device shown. In some examples, some devices shown only communicate with some other devices/services shown via one or more intermediary devices. Also, although network 130 is illustrated as one network, in some examples, network 130 may instead include multiple networks that may or may not be connected with each other, with some of the devices shown communicating with each other through one network of the multiple networks and other of the devices shown instead communicating with each other with a different network of the multiple networks.

System 100 may include more or less devices than illustrated in FIG. 1, which is shown by way of example only.

Figure 2:
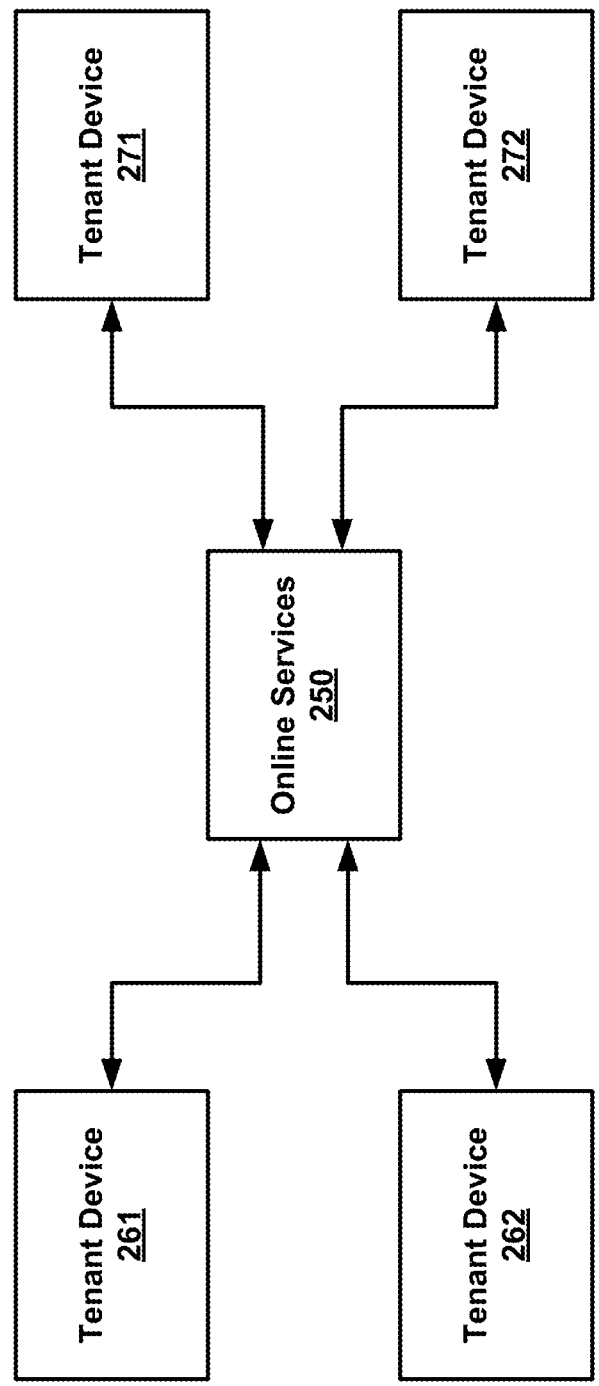
FIG. 2 is a block diagram illustrating an example of a system for copying graph data in cross-tenant collaborations between tenancies homed in different regions.

FIG. 2 is a block diagram illustrating an example of a system (200). System 200 may be an example of system 100 of FIG. 1. System 200 is described as follows in accordance with some examples. System 200 includes online services 250, tenant devices 261 and 262 for a first tenant, and tenant devices 271 and 272 for a second tenant. Online services 250 includes one or more distributed systems.

Online services 250 provides one or more services on behalf of users, as follows according to some examples. Among other things, the services provided by online services 250 to users of each tenant include cloud services, access to various applications, communications services, security services, device management services, file services including the storing, access, and sharing of files by the users of the tenant, or the like. Data stored by online services 250 on behalf of tenants has a graph structure that models and stores customer data. In the graph structure, the users and documents are modeled as nodes, and user activity is modeled as edges that connect the user and document nodes. The graph structure is modeled in such a way that graph queries may be used to determine various information about the data modeled by the graph.

More specifically, in a graph structure, entities are presented as nodes, and relationships between those entities are presented as edges in a view of a relational graph maintained by a graph database on a graph server. Each of the nodes describes the corresponding entity and includes a set of accompanying properties of the corresponding entity, such as names, titles, ages, addresses, or the like. Each property can be considered a key/value pair that includes a name of the property and its corresponding value. Entities represented as nodes include documents, meetings, communication, etc., as well as edges representing relations among these entities, such as an edge between a user node and a document node representing the user's authorship, modification, or view of the document.

The relational graph may be periodically queried by users via graph queries to learn about the relationships between entities. For example, a user may issue a graph query to find friends or contacts within a social network, the documents that a given user has interacted with, the users that a given document has been accessed by, the users that a given document has been accessed by within a specified time frame, the entities that satisfy various search criteria, or the like. The graph server executes graph queries that are submitted by users. The graph server may also be used to access the graph structure description, which resides in the graph database, which may include, in various aspects: a relational database, a not-only-Structured-Query-Language (NoSQL) database, or another suitable database.

Each tenant subscribed to online services 250 is homed in at least one particular geographical location. The graph data for the tenant is in the geographical region(s) in which the tenant is homed. The tenants include a first tenant that makes use of various devices, including tenant devices 261 and 262, and a second tenant that makes use of various devices, including tenant devices 271 and 272. The second tenant is homed in at least one geographical region that is different from the geographical region(s) in which the first tenant is homed. Each user has a native identity that is associated with the tenant to which a user belongs.

Each tenant may have various associated policies, including data access policies that control access to data that is stored by the productivity service on behalf of the tenant. The data access policies may indicate which users associated with the tenant have access to which data.

Online services 250 enable a cross-tenant collaboration to be created between the first tenant and the second tenant. The cross-tenant collaboration makes it possible for users of the first tenant and users of the second tenant to use their native identities to share experiences, services, data, or the like with each other. Access policies, security policies, and the like may be used to control the access that users of a different tenant are permitted to have. Each tenant has a complementary cross-tenancy access policy that specifies what tenancies the particular tenancy can collaborate with, where the complementary cross-tenancy policies in each tenant overlap with each other.

In some examples, the experiences that each user has access to in the other tenant is set by default. In other examples, the cross-tenancy access policy has details about sets of users that are allowed to collaborate and the particular experiences in the other tenancy that each of the sets of users are permitted to access. In some examples, administrators of collaborating tenants communicate identities of the participating users out-of-band, so that the administrator of each tenant can configure the policies to enable those users to participate in particular experiences in that tenant. Various experiences may be shared among users of different tenancies via the cross-tenancy collaboration. As one example, the cross-tenancy collaboration may allow the granting of read and write privileges to users to documents stored in the other tenancy.

Some or all of the graph data stored on behalf of the first tenant is copied from the first tenant into the geographical region of the second tenant, and vice versa, so that graph query execution can complete without crossing geographical regions (and thus not suffer from the latency incurred by such crossings). In various examples, the data copied into the region of one tenancy into another may vary, and the timing by which the data to be copied may vary, as discussed in greater detail below.

For instance, in some examples, the entire graph of both tenancies is copied into the respective regions of both tenancies.

In other examples, instead of copying the entire graph of both tenancies into the respective regions of both tenancies, only a portion of the entire graph is copied into the other tenancy. For instance, in some examples, a slice of the graph for one tenant accessible to some user in the other tenant is copied into the region of the other tenant, and vice versa. In some examples, determining the slices of data be copied may accomplished by scanning the metadata in the graph to determine which graph data should be copied. In other examples, graph queries may be used to determine which graph data should be copied. In these examples, a graph query is used to determine which slices of the graph of one tenant to copy into the region of the other tenant.

In other examples, rather than copying all data that is accessible to some user, data that is unlikely to be accessed is not copied. In some examples, graph queries may be used to determine which data is to be copied. Policies in the tenant as to which data can or cannot be copied across regional boundaries are observed by the graph queries. Also, the copying of particular data may be avoided for reasons of privacy, confidentiality, security, legal requirements, regulatory requirements, or the like.

As discussed above, in some examples, a graph query is used to determine which slices of the graph of one tenant to copy into the region of the other tenant. In some examples, graph queries may be based on interactions that the users perform with online services 250 that are stored in the graph structure. For instance, in some examples, a graph query targets only those slices of the graph accessible to a user in the other tenant, and only nodes with edges connected to users homed in the other tenant. Such node and edges not directly connected to a user in the other tenant are candidates for copying and are still captured in a graph query that determines which slices of the graph to copy. In various examples, various copying policies could be expressed in the form of graph queries, ranging from queries that span the entire graph or only the parts of the graph accessible to users in the other tenant, to policies such as a particular number hops from nodes homed in one tenancy that are connected directly (or indirectly through a particular number of hops) to nodes homed in the other tenancy of the cross-tenancy collaboration.

In various examples, various other strategies may be used in determining the graph data to be copied via graph queries. For instance, in some examples, selection of what data to copy is done through multiple graph queries. In some examples, the multiple graph queries are tailored to specific scenarios. In some examples, the multiple graph queries may be used to accomplish the speculative copying of graph data. Speculative copying involves the use of a probabilistic function to decide to proactively copy some graph data into another region, where a popularity function is just one example of such a probabilistic function. Speculative copying may balance cost/latency tradeoff where some wasteful copying is employed to potentially provide lower latency for some fraction of graph queries.

For instance, one example of the speculative copying is data is running a graph query based on the popularity of documents. The popularity is based on the number/quantity of times that the documents have been accessed. The identified nodes and a subset of edges are then copied into the region of the other tenant under the assumption that this slice of the graph of one tenant is likely to be spanned by a query issued in the context of a user in the other tenant because of the popularity of the documents. Other various suitable factors may also be used in the graph queries in various examples. For instance, in some examples, the query may be specified to only fetch documents that have been modified within a threshold number of days.

The timing of when to execute a graph query to select graph data to copy into another region is done differently in different examples.

In some examples, execution of a graph query to select graph data to copy into another region are done periodically. In some examples, execution of a graph query to select graph data to copy into another region is triggered in response to certain types of edges or nodes being added to a graph, as well as in response to changes to existing graph entities. For instance, this may capture changes in which access to data in one tenant is revoked from a user in the other tenant, such as after termination of a contracting relationship. Such access control changes will result in changes to the nodes and edges in the graph for the tenant, either directly (e.g., if a document is modeled as a node) or indirectly (e.g., if an edge models that two documents are similar, then access to the edge requires access to both documents—revocation of access to either of the two documents indirectly also revokes access to the edge).

In some examples, a change in the security context of a user may be used to trigger execution of a graph query to select graph data to copy into another region. This may be used to capture changes to a graph that result from a change in security context that do not result in changes to nodes and edges.

In some examples, rather than always copying a full representation of the nodes and edges in the graph, in at least some instances, a partial representation of the nodes and edges in the graph are created instead. For instance, in some examples, in may be desirable to not copy a full representation of the node in a different geographical region for reasons such as legal requirements, performance requirements, security reasons, privacy reasons, or the like. For instance, the graph information may include details associated with each user, such as the office location, home telephone number, and other information associated with each user. Rather than copying a full representation of the nodes and edges, a partial representation that excludes information such as the office location, home telephone number, and other sensitivity may be excluded in the partial representation of the portions of the graph data that are copied.

In some examples, online services 250 only allows each tenant to be homed in one geographical region. In other examples, online services 250 allows a tenant to be homed in more than one geographical region. For instance, in some examples, online services 250 enables a tenant that is a multinational corporation to be homed in multiple geographical regions. In some examples, when a collaboration occurs between two tenants in which at least one of the tenants is homed in multiple geographical locations, and there is at least one geographical region in which one of the collaborating tenants is homed and the other collaborating tenant is not, then graph data is copied into each of the geographical regions in which the other collaborating tenant is not homed.

Illustrative Processes

Figure 3:
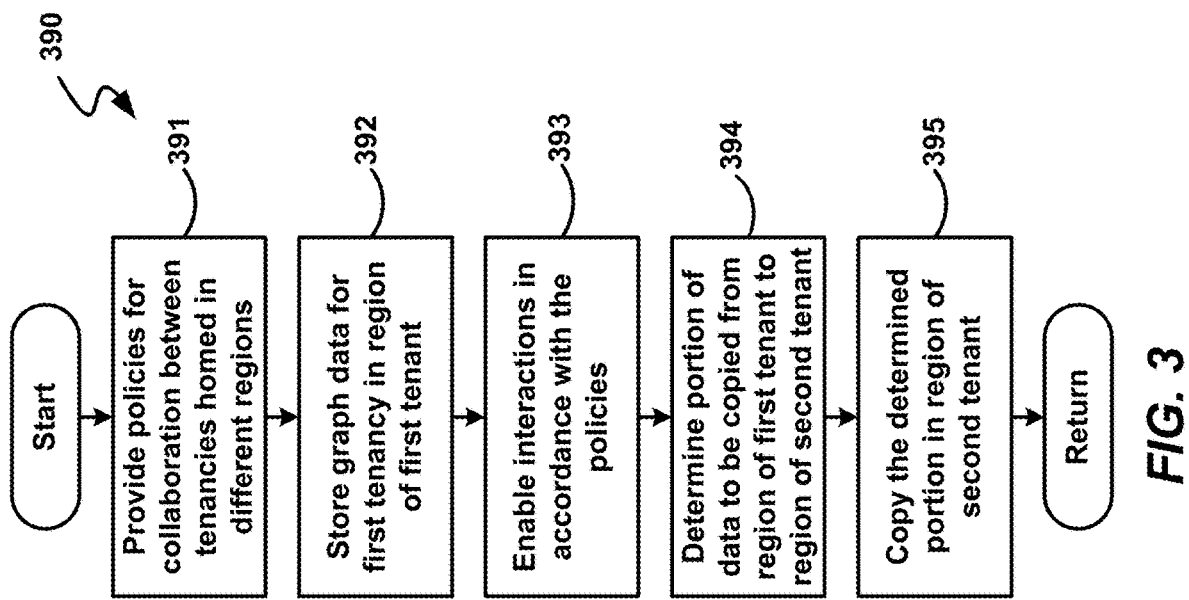
FIG. 3 is a flow diagram illustrating an example process for copying graph data in cross-tenant collaborations between tenancies homed in different regions.

FIG. 3 is a diagram illustrating an example dataflow for a process (390) for copying graph data in cross-tenant collaborations between tenancies homed in different regions. In some examples, process 390 may be performed by an example of one of the online service devices 151 or 152 of FIG. 1, by an example of online services 250 of FIG. 2, by an example of device 400 of FIG. 4, or the like. In some examples, process 390 proceeds as follows.

Step 391 occurs first. At step 391, policies that are associated with a cross-tenancy collaboration in a multi-tenant service are provided. The cross-tenancy collaboration is a collaboration between two different tenancies including a first tenancy that is homed in a first geographical region and a second tenancy that is homed in a second geographical region that is different from the first geographical region. A first plurality of users is associated with the first tenancy. A second plurality of users, different from the first plurality of users, is associated with the second tenancy. As shown, step 392 occurs next. At step 392, in the first geographical region, a first set of graph data is stored. The first set of the graph data is associated with the first tenancy.

As shown, step 393 occurs next. At step 393, the first plurality of users and the second plurality of users are enabled to perform interactions that are associated with the multi-tenant service, including cross-tenancy interactions between the first tenancy and the second tenancy in accordance with the policies. As shown, step 394 occurs next. At step 394, a portion of the first set of the graph data to be copied from the first geographical region to the second geographical region is determined. As shown, step 395 occurs next. At step 395, in response to determining the portion of the first set of the graph data, a copy of the portion of the first set of the graph data is stored in the second geographical region. The process may then advance to a return block, where other processing is resumed.

Illustrative Devices/Operating Environments

Figure 4:
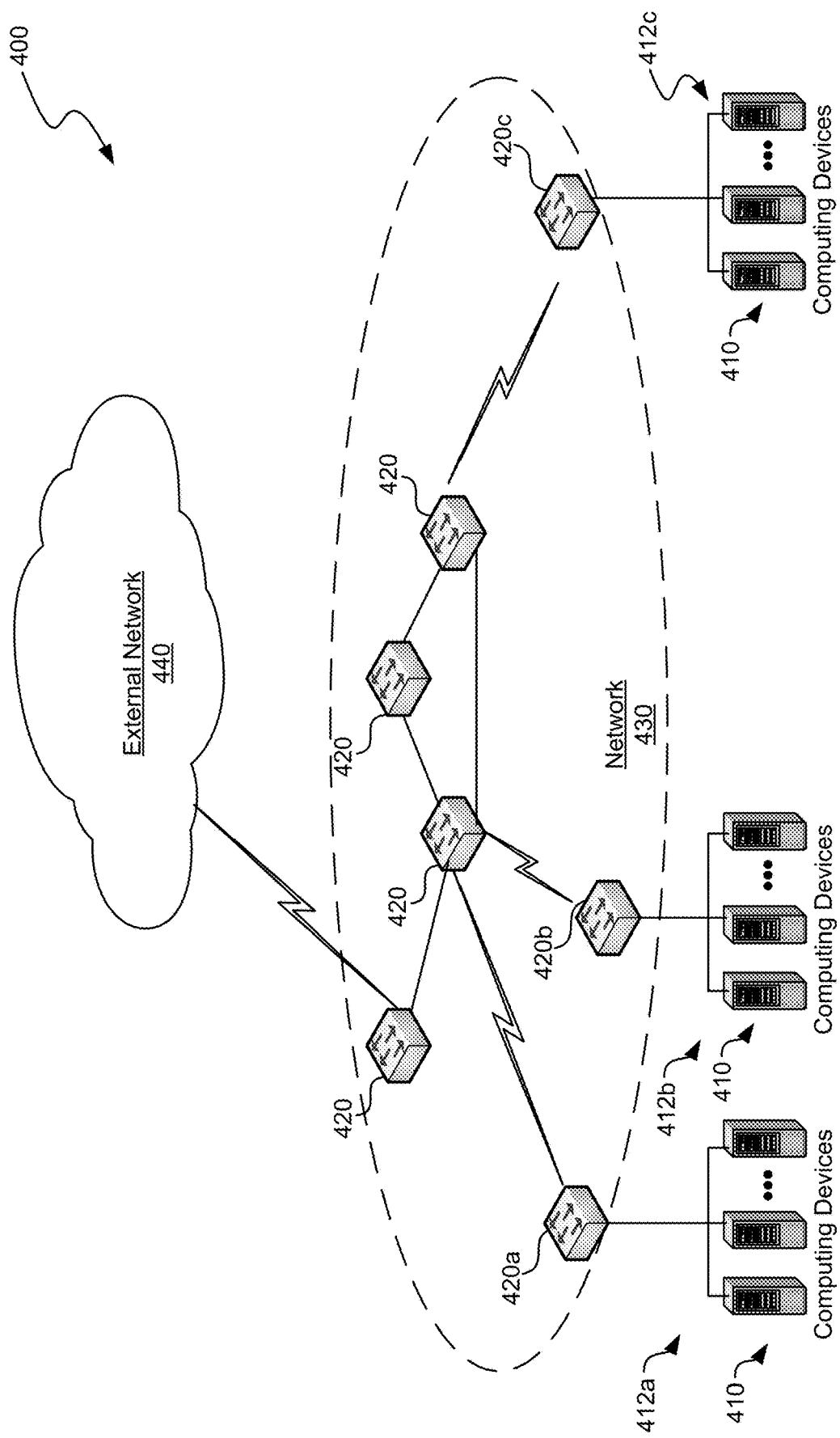
FIG. 4 is a block diagram illustrating one example of a suitable environment in which aspects of the technology may be employed.

FIG. 4 is a diagram of environment 400 in which aspects of the technology may be practiced. As shown, environment 400 includes computing devices 410, as well as network nodes 420, connected via network 430. Even though particular components of environment 400 are shown in FIG. 4, in other examples, environment 400 can also include additional and/or different components. For example, in certain examples, the environment 400 can also include network storage devices, maintenance managers, and/or other suitable components (not shown). Computing devices 410 shown in FIG. 4 may be in various locations, including a local computer, on premise, in the cloud, or the like. For example, computer devices 410 may be on the client side, on the server side, or the like.

As shown in FIG. 4, network 430 can include one or more network nodes 420 that interconnect multiple computing devices 410, and connect computing devices 410 to external network 440, e.g., the Internet or an intranet. For example, network nodes 420 may include switches, routers, hubs, network controllers, or other network elements. In certain examples, computing devices 410 can be organized into racks, action zones, groups, sets, or other suitable divisions. For example, in the illustrated example, computing devices 410 are grouped into three host sets identified individually as first, second, and third host sets 412a-112c. In the illustrated example, each of host sets 412a-112c is operatively coupled to a corresponding network node 420a-120c, respectively, which are commonly referred to as "top-of-rack" or "TOR" network nodes. TOR network nodes 420a-120c can then be operatively coupled to additional network nodes 420 to form a computer network in a hierarchical, flat, mesh, or other suitable types of topology that allows communications between computing devices 410 and external network 440. In other examples, multiple host sets 412a-112c may share a single network node 420. Computing devices 410 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 410 may be individually configured to provide computing, storage, and/or other suitable computing services.

In some examples, one or more of the computing devices 410 is a device that is configured to be at least part of a system for copying graph data in cross-tenant collaborations between tenancies homed in different regions.

Illustrative Computing Device

FIG. 5 is a diagram illustrating one example of computing device 500 in which aspects of the technology may be practiced. Computing device 500 may be virtually any type of general- or specific-purpose computing device. For example, computing device 500 may be a user device such as a desktop computer, a laptop computer, a tablet computer, a display device, a camera, a printer, or a smartphone. Likewise, computing device 500 may also be a server device such as an application server computer, a virtual computing host computer, or a file server computer, e.g., computing device 500 may be an example of computing device 410 or network node 420 of FIG. 4. Likewise, computer device 500 may be an example any of the devices, a device within any of the distributed systems, illustrated in or referred to in any of the above figures, as discussed in greater detail below. As illustrated in FIG. 5, computing device 500 may include processing circuit 510, operating memory 520, memory controller 530, bus 540, data storage memory 550, input interface 560, output interface 570, and network adapter 580. Each of these afore-listed components of computing device 500 includes at least one hardware element.

Computing device 500 includes at least one processing circuit 510 configured to execute instructions, such as instructions for implementing the herein-described workloads, processes, and/or technology. Processing circuit 510 may include a microprocessor, a microcontroller, a graphics processor, a coprocessor, a field-programmable gate array, a programmable logic device, a signal processor, and/or any other circuit suitable for processing data. The aforementioned instructions, along with other data (e.g., datasets, metadata, operating system instructions, etc.), may be stored in operating memory 520 during run-time of computing device 500. Operating memory 520 may also include any of a variety of data storage devices/components, such as volatile memories, semi-volatile memories, random access memories, static memories, caches, buffers, and/or other media used to store run-time information. In one example, operating memory 520 does not retain information when computing device 500 is powered off. Rather, computing device 500 may be configured to transfer instructions from a non-volatile data storage component (e.g., data storage component 550) to operating memory 520 as part of a booting or other loading process. In some examples, other forms of execution may be employed, such as execution directly from data storage component 550, e.g., eXecute In Place (XIP).

Operating memory 520 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudorandom random access memory (PSRAM), and/or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 510 via memory controller 530 in channels. One example of computing device 500 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 520 specifically does not include or encompass communications media, any communications medium, or any signals per se.

Memory controller 530 is configured to interface processing circuit 510 to operating memory 520. For example, memory controller 530 may be configured to interface commands, addresses, and data between operating memory 520 and processing circuit 510. Memory controller 530 may also be configured to abstract or otherwise manage certain aspects of memory management from or for processing circuit 510. Although memory controller 530 is illustrated as single memory controller separate from processing circuit 510, in other examples, multiple memory controllers may be employed, memory controller(s) may be integrated with operating memory 520, and/or the like. Further, memory controller(s) may be integrated into processing circuit 510. These and other variations are possible.

In computing device 500, data storage memory 550, input interface 560, output interface 570, and network adapter 580 are interfaced to processing circuit 510 by bus 540. Although FIG. 5 illustrates bus 540 as a single passive bus, other configurations, such as a collection of buses, a collection of point-to-point links, an input/output controller, a bridge, other interface circuitry, and/or any collection thereof may also be suitably employed for interfacing data storage memory 550, input interface 560, output interface 570, and/or network adapter 580 to processing circuit 510.

In computing device 500, data storage memory 550 is employed for long-term non-volatile data storage. Data storage memory 550 may include any of a variety of non-volatile data storage devices/components, such as non-volatile memories, disks, disk drives, hard drives, solid-state drives, and/or any other media that can be used for the non-volatile storage of information. However, data storage memory 550 specifically does not include or encompass communications media, any communications medium, or any signals per se. In contrast to operating memory 520, data storage memory 550 is employed by computing device 500 for non-volatile long-term data storage, instead of for run-time data storage.

Also, computing device 500 may include or be coupled to any type of processor-readable media such as processor-readable storage media (e.g., operating memory 520 and data storage memory 550 and communication media (e.g., communication signals and radio waves). While the term processor-readable storage media includes operating memory 520 and data storage memory 550, the term "processor-readable storage media," throughout the specification and the claims, whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 500 also includes input interface 560, which may be configured to enable computing device 500 to receive input from users or from other devices. In addition, computing device 500 includes output interface 570, which may be configured to provide output from computing device 500. In one example, output interface 570 includes a frame buffer, graphics processor, graphics processor or accelerator, and is configured to render displays for presentation on a separate visual display device (such as a monitor, projector, virtual computing client computer, etc.). In another example, output interface 570 includes a visual display device and is configured to render and present displays for viewing. In yet another example, input interface 560 and/or output interface 570 may include a universal asynchronous receiver/transmitter (UART), a Serial Peripheral Interface (SPI), Inter-Integrated Circuit (I2C), a General-purpose input/output (GPIO), and/or the like. Moreover, input interface 560 and/or output interface 570 may include or be interfaced to any number or type of peripherals.

In the illustrated example, computing device 500 is configured to communicate with other computing devices or entities via network adapter 580. Network adapter 580 may include a wired network adapter, e.g., an Ethernet adapter, a Token Ring adapter, or a Digital Subscriber Line (DSL) adapter. Network adapter 580 may also include a wireless network adapter, for example, a Wi-Fi adapter, a Bluetooth adapter, a ZigBee adapter, a Long-Term Evolution (LTE) adapter, SigFox, LoRa, Powerline, or a 5G adapter.

Although computing device 500 is illustrated with certain components configured in a particular arrangement, these components and arrangements are merely one example of a computing device in which the technology may be employed. In other examples, data storage memory 550, input interface 560, output interface 570, or network adapter 580 may be directly coupled to processing circuit 510 or be coupled to processing circuit 510 via an input/output controller, a bridge, or other interface circuitry. Other variations of the technology are possible.

Some examples of computing device 500 include at least one memory (e.g., operating memory 520) having processor-executable code stored therein, and at least one processor (e.g., processing unit 510) that is adapted to execute the processor-executable code, wherein the processor-executable code includes processor-executable instructions that, in response to execution, enables computing device 500 to perform actions, where the actions may include, in some examples, actions for one or more processes described herein, such as the process shown in FIG. 3, as discussed in greater detail above.

The above description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on," and includes the option of being based on additional factors, some of which may not be described herein. As another example, the term "via" is not exclusive, and is equivalent to the term "via, at least in part," and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof. The term "cloud" or "cloud computing" refers to shared pools of configurable computer system resources and higher-level services over a wide-area network, typically the Internet. "Edge" devices refer to devices that are not themselves part of the cloud but are devices that serve as an entry point into enterprise or service provider core networks.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus for copying of graph data in cross-tenant collaborations between tenants homed in different geographical regions, comprising:
 a device including at least one memory having processor-executable code stored therein, and at least one processor that is adapted to execute the processor-executable code, wherein the processor-executable code includes processor-executable instructions that, in response to execution, enable the device to perform actions, including:
  providing data access policies that are associated with a cross-tenancy collaboration in a multi-tenant service, wherein the multi-tenant service provides services to a plurality of tenants including a first tenant and a second tenant, each tenant is a company that includes a plurality of users and each user of the plurality of users has a native identity that is associated with a tenant to which the user belongs, the first tenant is homed in a first geographical region and the second tenant is homed in a second geographical region, wherein the first geographical region is distinct from and non-overlapping with the second geographical region such that there is a difference in data access time between the first geographical region and the second geographical region, a first plurality of users is associated with the first tenant, a second plurality of users is associated with the second tenant, the second plurality of users is different from the first plurality of users, and the second tenant is different from the first tenant, data associated with the first tenant is stored in the first geographical region and data associated with the second tenant is stored in the second geographical region and the data access policies control access to data that is stored on behalf of each tenant;
  storing, in the first geographical region, a first set of graph data, wherein the first set of the graph data is associated with the first tenant;
  enabling the first plurality of users and the second plurality of users to perform interactions that are associated with the multi-tenant service, wherein the interactions include cross-tenancy interactions between the first tenant and the second tenant in accordance with the policies;
  identifying a portion of the first set of the graph data to be copied from the first geographical region to the second geographical region;
  in response to identifying the portion of the first set of the graph data, storing a copy of the portion of the first set of the graph data in the second geographical region;
  receiving a graph query for the first set of graph data in the second geographical region; and
  executing the query against the first set of graph data in the second geographical region.

2. The apparatus of claim 1, wherein identifying the portion of the first set of the graph data is based on the interactions.

3. The apparatus of claim 1, wherein identifying the portion of the first set of the graph data is based on a graph query that determines, based on the interactions, the portion of data to be copied from the first geographical region to the second geographical region.

4. The apparatus of claim 1, further comprising:
 storing, in the second geographical region, a second set of the graph data, wherein the second set of the graph data is associated with the second tenant;
 identifying a portion of the second set of the graph data to be copied from the second geographical region to the first geographical region; and
 in response to identifying the portion of the second set of the graph data, storing a copy of the portion of the second set of the graph data in the first geographical region.

5. The apparatus of claim 1, wherein
 the graph data includes nodes and edges;
 the graph data is structured to enable graph queries of the graph data to be made;
 the edges include information about relationships between the nodes; and
 the nodes include: for each user of the first plurality of users and the second plurality of users, a node that models that user; and for each document stored on behalf of the first tenant and the second tenant, a node that models that document.

6. The apparatus of claim 1, wherein identifying g the portion of the first set of the graph data includes identifying which portion of the first set of the graph data is accessible to a least one user of the second plurality of users.

7. The apparatus of claim 1, wherein a distance between the first geographical region to the second geographical region is greater than 2000 miles.

8. The apparatus of claim 1, wherein the portion of the first set of the graph data is a partial representation of a subset of the first set of the graph data.

9. The apparatus of claim 1, wherein identifying the portion of the first set of the graph data is based on a graph query to identify policies that are a first particular number of hops from nodes in the graph data homed in the first tenant that are connected nodes that are within a second particular number of hops from nodes in the graph data homed in the second tenant.

10. The apparatus of claim 1, wherein identifying the portion of the first set of the graph data is based in part on a graph query that determines a quantity of recent accesses to documents represented in the graph data.

11. The apparatus of claim 1, wherein identifying the portion of the first set of the graph data is based on a plurality of graph queries that are performed at periodic time intervals.

12. The apparatus of claim 1, wherein identifying the portion of the first set of the graph data is based on a plurality of graph queries that are performed responsive to being triggered based on at least one predetermined event.

13. The apparatus of claim 12, wherein the at least one predetermined event includes a change in security context of at least one user.

14. A method for copying of graph data in cross-tenant collaborations between tenants homed in different geographical regions, comprising:
    data access policies that are associated with a cross-tenancy collaboration in a multi-tenant service, wherein the multi-tenant service provides services to a plurality of tenants including a first tenant and a second tenant, each tenant is a company that includes a plurality of users and each user of the plurality of users has a native identity that is associated with a tenant to which the user belongs, the first tenant is homed in a first geographical region and the second tenant is homed in a second geographical region, wherein the first geographical region is distinct from and non-overlapping with the second geographical region such that there is a difference in data access time between the first geographical region and the second geographical region, a first plurality of users is associated with the first tenant, a second plurality of users is associated with the second tenant, the second plurality of users is different from the first plurality of users, and the second tenant is different from the first tenant, data associated with the first tenant is stored in the first geographical region and data associated with the second tenant is stored in the second geographical region and the data access policies control access to data that is stored on behalf of each tenant;
    in the first geographical region, storing a first set of graph data, wherein the first set of the graph data is associated with the first tenant;
    enabling the first plurality of users and the second plurality of users to perform interactions that are associated with the multi-tenant service, wherein the interactions include cross-tenancy interactions between the first tenant and the second tenant in accordance with the policies;
    via at least one processor, identifying a portion of the first set of the graph data to be copied from the first geographical region to the second geographical region;
    responsive to identifying the portion of the first set of graph data, storing a copy of the portion of the first set of the graph data in the second geographical region;
    receiving a graph query for the first set of graph data in the second regional region; and
    executing the query against the first set of graph data in the second geographical region.

15. The method of claim 14, wherein identifying the portion of the first set of the graph data is based on the interactions.

16. The method of claim 14, wherein identifying the portion of the first set of the graph data is based on a graph query that determines, based on the interactions, the portion of data to be copied from the first geographical region to the second geographical region.

17. The method of claim 14, further comprising:
    in the second geographical region, storing a second set of the graph data, wherein the second set of the graph data is associated with the second tenant;
    identifying a portion of the second set of the graph data to be copied from the second geographical region to the first geographical region; and
    in response to identifying the portion of the second set of the graph data, storing a copy of the portion of the second set of the graph data in the first geographical region.

18. A processor-readable storage medium, having stored thereon processor-executable code that, upon execution by at least one processor, enables actions, comprising:
    storing, in a first geographical region, a first set of graph data, wherein the first set of the graph data is associated with a first tenant, the first tenant and a second tenant have a cross-tenancy collaboration in a multi-tenant service, the multi-tenant service provides services to a plurality of tenants including the first tenant and the second tenant, each tenant is a company that includes a plurality of users, the first tenant is homed in the first geographical region and the second tenant that is homed in a second geographical region, a first plurality of users is associated with the first tenant, a second plurality of users is associated with the second tenant, the second plurality of users is different from the first plurality of users, the second tenant is different from the first tenant, and wherein the second geographical region is different distinct from and non-overlapping with the first geographical region such that there is a difference in data access time between the first geographical region and the second geographical region and data access policies control access to data that is stored on behalf of each tenant;
    identifying a portion of the first set of the graph data to be copied from the first geographical region to the second geographical region; and
    in response to identifying the portion of the first graph set of graph data, storing a copy of the portion of the first set of the graph data in the second geographical region;
    receiving a graph query for the first set of graph data in the second geographical region; and
    executing the query against the first set of graph data in the second geographical region.

19. The processor-readable storage medium of claim 18, wherein identifying the portion of the first set of the graph data is based on a graph query that determines the portion of data to be copied from the first geographical region to the second geographical region.

20. The processor-readable storage medium of claim 18, the actions further comprising:
    storing, in the second geographical region, a second set of the graph data, wherein the second set of the graph data is associated with the second tenant;
    identifying a portion of the second set of the graph data to be copied from the second geographical region to the first geographical region; and
    in response to identifying the portion of the second set of the graph data, storing a copy of the portion of the second set of the graph data in the first geographical region.

* * * * *